United States Patent [19]

Shima et al.

[11] Patent Number: 5,489,924
[45] Date of Patent: Feb. 6, 1996

[54] COMPUTER AND DISPLAY APPARATUS WITH INPUT FUNCTION

[75] Inventors: Hisashi Shima; Atsuo Yagihashi, both of Fujisawa; Kazuhiko Yamazaki, Hiratsuka, all of Japan

[73] Assignee: International Business Machines Corporation, Armonk, N.Y.

[21] Appl. No.: 352,284

[22] Filed: Dec. 8, 1994

Related U.S. Application Data

[63] Continuation of Ser. No. 993,214, Dec. 18, 1992, abandoned.

[30] Foreign Application Priority Data

Dec. 18, 1991 [JP] Japan ................................ 3-333787

[51] Int. Cl.$^6$ ...................................................... G09G 3/02
[52] U.S. Cl. ............................ 345/173; 345/905; 361/681
[58] Field of Search .................................. 345/173, 178, 345/179

[56] References Cited

U.S. PATENT DOCUMENTS 4,859,092  8/1989  Makita ........................................ 400/83
4,995,579  2/1991  Kitamura .................................. 248/919
5,179,447  1/1993  Lain .......................................... 248/917
5,200,913  4/1993  Hawkins et al. ......................... 345/169
5,268,817  12/1993  Miyagawa et al. ..................... 361/729

FOREIGN PATENT DOCUMENTS 63-39731  3/1988  Japan .
0090310  3/1990  Japan ................................ G06F 1/16
0254514  10/1990  Japan ................................ G06F 1/16
3278212  12/1991  Japan ................................ G06F 1/16

*Primary Examiner*—Tommy P. Chin
*Assistant Examiner*—Gin Goon
*Attorney, Agent, or Firm*—Ronald L. Drumheller

[57] ABSTRACT

A computer or a display apparatus with an input function which is of simple construction and has high operability for touch input or pen input. A system body, a cover unit having a display panel with an input function on one side, and connection means such as a rotatable arm, which is rotatably connected to the cover unit and to the system body at a different portion from a portion at which said cover unit is conventionally connected, so as to allow the cover unit to be placed on the system body in a position in which the display panel mounted on the cover unit is placed face up or face down. The cover unit can be placed upside down on the system body without sliding of the cover unit with respect to the system body.

32 Claims, 8 Drawing Sheets

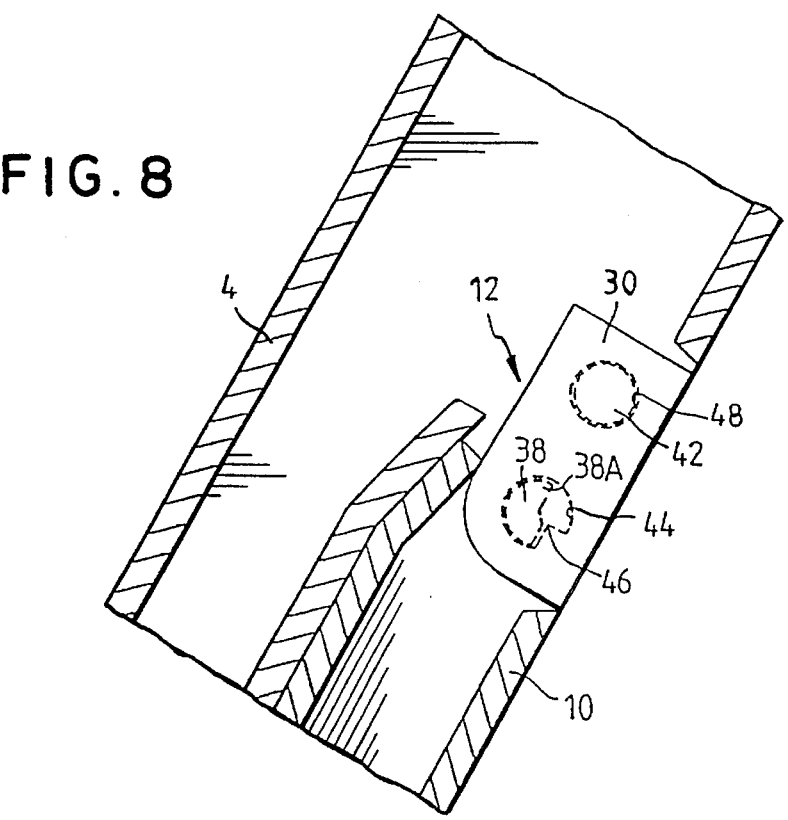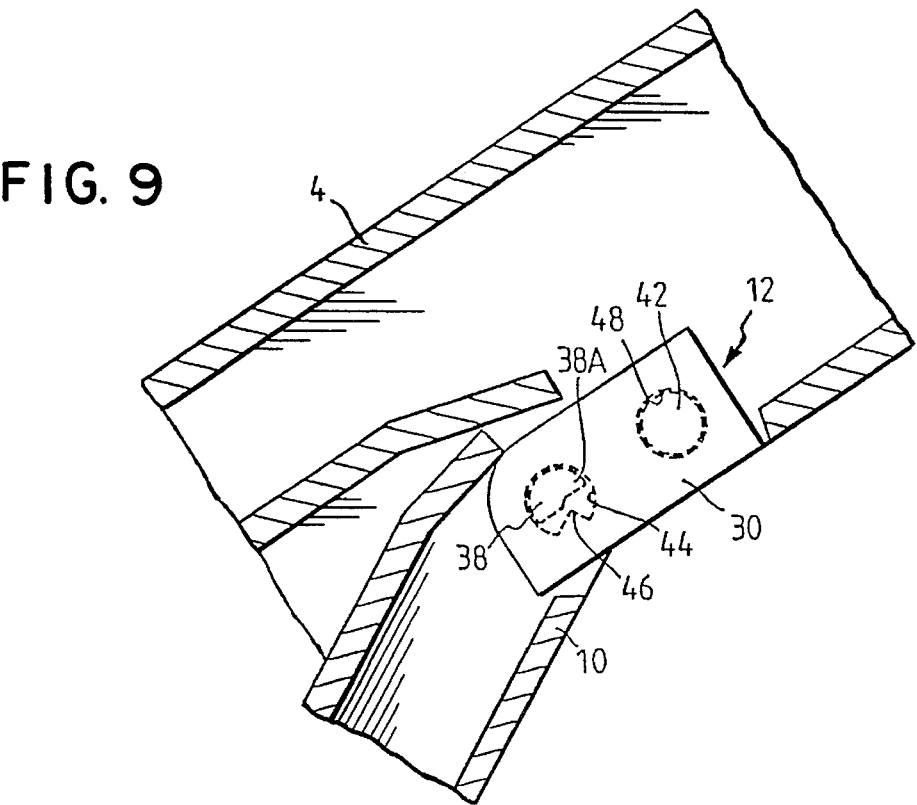

COMPUTER AND DISPLAY APPARATUS WITH INPUT FUNCTION

This is a continuation of application Ser. No. 07/993,214, filed Dec. 18, 1992 now abandoned.

FIELD OF THE INVENTION

The present invention relates to a computer or a display apparatus. More particularly, it relates to a computer provided with a flat panel display apparatus having input functions such as a touch sensor.

BACKGROUND ART

It is well known that a laptop computer or a notebook computer has a flat display apparatus using for example, a liquid crystal display (LCD). The addition of an input function such as a touch sensor to such a display apparatus enables the computer to accept touch input or pen input.

In laptop or notebook computers, a cover unit is attached to a system body in a manner which permits it to be opened or closed, and a display panel is embedded inside of the cover unit. Under this conventional construction, if an input function is added to the display apparatus, touch input or pen input has the disadvantage of difficulty in operation because the opened cover unit is pushed down by an input pen or finger tips.

A manner of construction under which the operability of touch input or pen input is improved is disclosed by Japanese Patent No. 63-39731. In the computer disclosed by this patent, an upper cover inside which a display panel with a transparent tablet is imbedded, is slidably or rotatably attached to the case of the system body. In such a computer, if touch input or pen input is attempted, the upper cover can be placed on the case of the system body with the display panel placed face up in a position in which the upper cover slides to the front end of the case of the system body. Thus, the upper cover would not be pushed down during touch input or pen input operation. However, it is actually difficult to implement a mechanical construction for smoothly sliding an upper cover to the front end of a case of the system body in a portable computer. Further, even if the upper cover smoothly slides to the front end of the case of the system body, a long cable is needed (or space for storing the long cable is needed within the case or the upper cover), to establish electrical connection between the upper cover and the case. It is, therefore, very difficult to utilize the construction described by Patent No. 63-39731 in a portable computer.

SUMMARY OF THE INVENTION

It is a primary object of the present invention to provide a computer and a display apparatus with an input function which has advantages of simplicity in construction and good operability for touch input or pen input.

In accordance with the present invention, a computer has a system body, a cover unit having a display panel with an input function on one side, and connection means, which is rotatably connected to the cover unit and to the system body at a place different from the place at which said cover unit is conventionally connected. This allows the cover unit to be placed on the system body in a position in which the display panel mounted on the cover unit may be placed face up or face down.

To attain the stated object, a display apparatus with an input function according to the present invention includes a base, a cover unit having a display panel with the input function on one side, and connection means, which is rotatably connected to the cover unit and to the base at a place different from the place at which the cover unit is conventionally connected. This allows the cover unit to be placed on the base in a position in which the display panel mounted on the cover unit may be face up or face down.

BRIEF DESCRIPTION OF THE DRAWINGS

FIG. 8 is a fragmentary sectional view showing the hinge means of FIG. 7 in a position in which the cover unit is not rotated backward away from the connection means.

FIG. 9 is a fragmentary sectional view showing the hinge means of FIG. 7 in a position in which the cover unit is moved backward away from the connection means, but is not rotated with respect to a parallelepiped of the hinge means.

DETAILED DESCRIPTION OF THE PREFERRED EMBODIMENT

Figure 1:
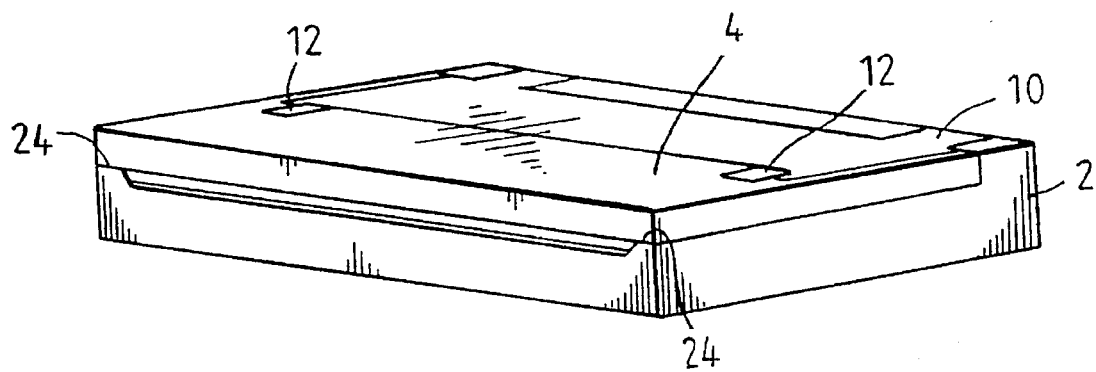
FIG. 1 is a perspective view of a portable computer in accordance with an embodiment of the present invention, with a cover unit in the closed position.
Figure 2:
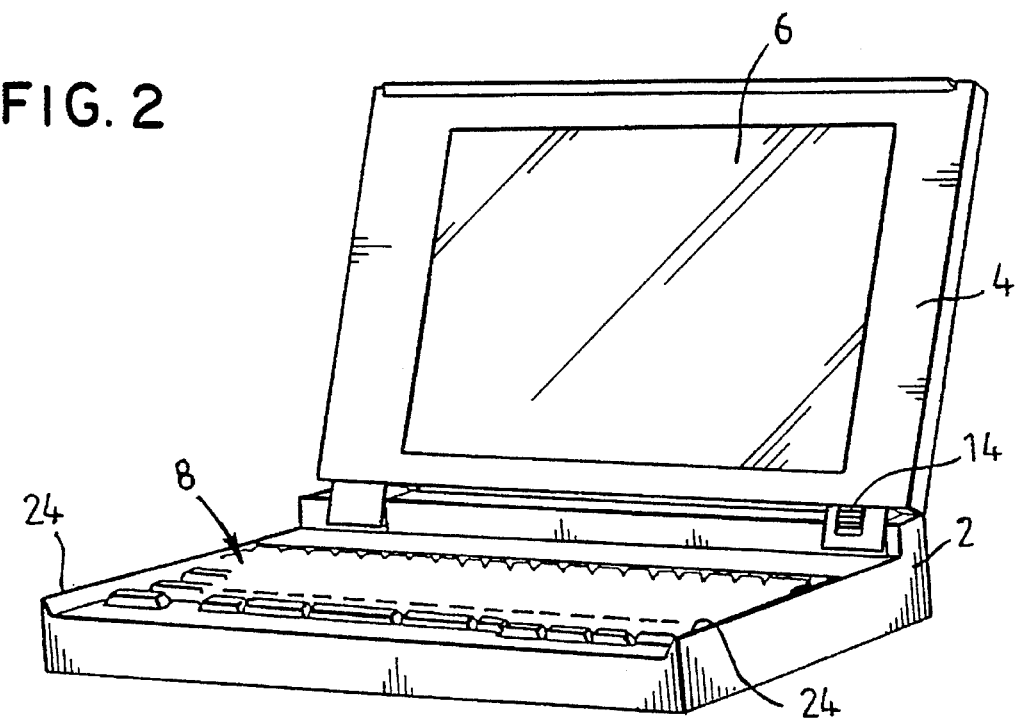
FIG. 2 is a perspective view of the computer of FIG. 1 showing the cover unit in an open position.

As illustrated in FIG. 1 and FIG. 2, a cover unit 4 is attached to an edge of the rear end of a system body 2 so that it can be opened or closed, that is, it can be rotated. In FIG. 2, mounted on the inside of the cover unit 4 is a display panel 6. The display panel 6 is a flat-type display apparatus, for example, an LCD or a plasma display apparatus, which is provided with a transparent touch sensor panel on the surface to add an input function that enables touch input or pen input, to the display panel 6. Provided on the top surface of the system body 2 is a keyboard 8.

Figure 3:
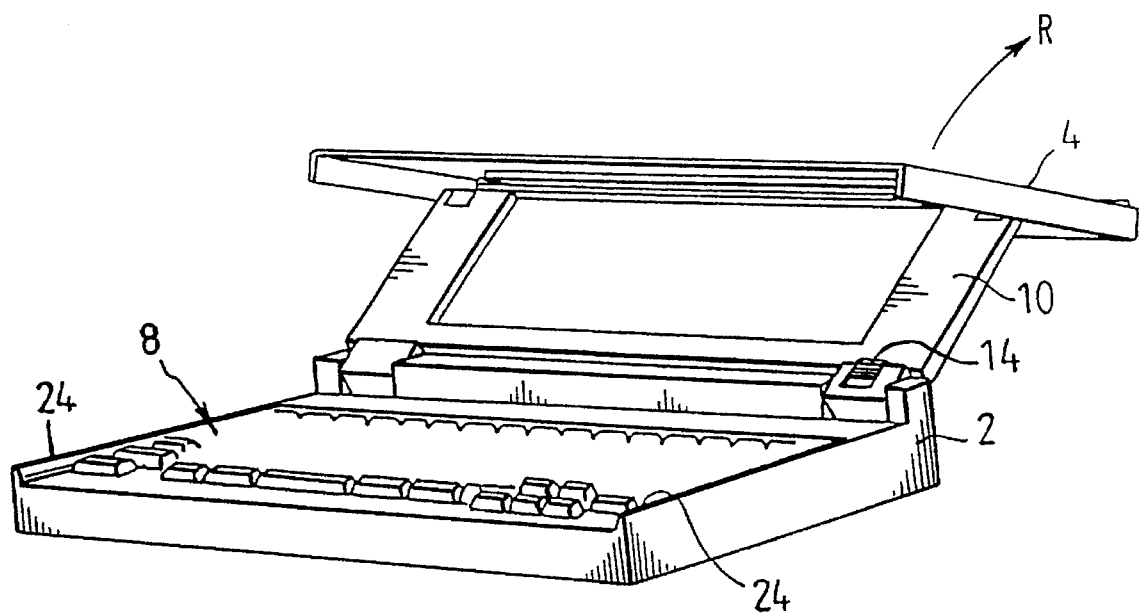
FIG. 3 is a perspective view of tile computer of FIG. 1 showing tile cover unit in an open position and rotated so as to be moved backward.

As shown in FIG. 3, the cover unit 4 is not directly connected to the system body 2, but connected, through a rotatable arm or connection means 10, to the system body 2. The base edge of the connection means 10 is rotatably connected to the top edge of the rear end of the system body 2. On the other hand, the opposite, rotatable edge of the connection means 10 is rotatably connected, in the middle of the cover unit 4 in the transverse direction of the cover unit 4, to the cover unit 4. As described later in detail, the cover unit 4 and the connection means 10 are connected, by a hinge means 12 (FIG. 1 and FIG. 4), to each other.

Figure 6:
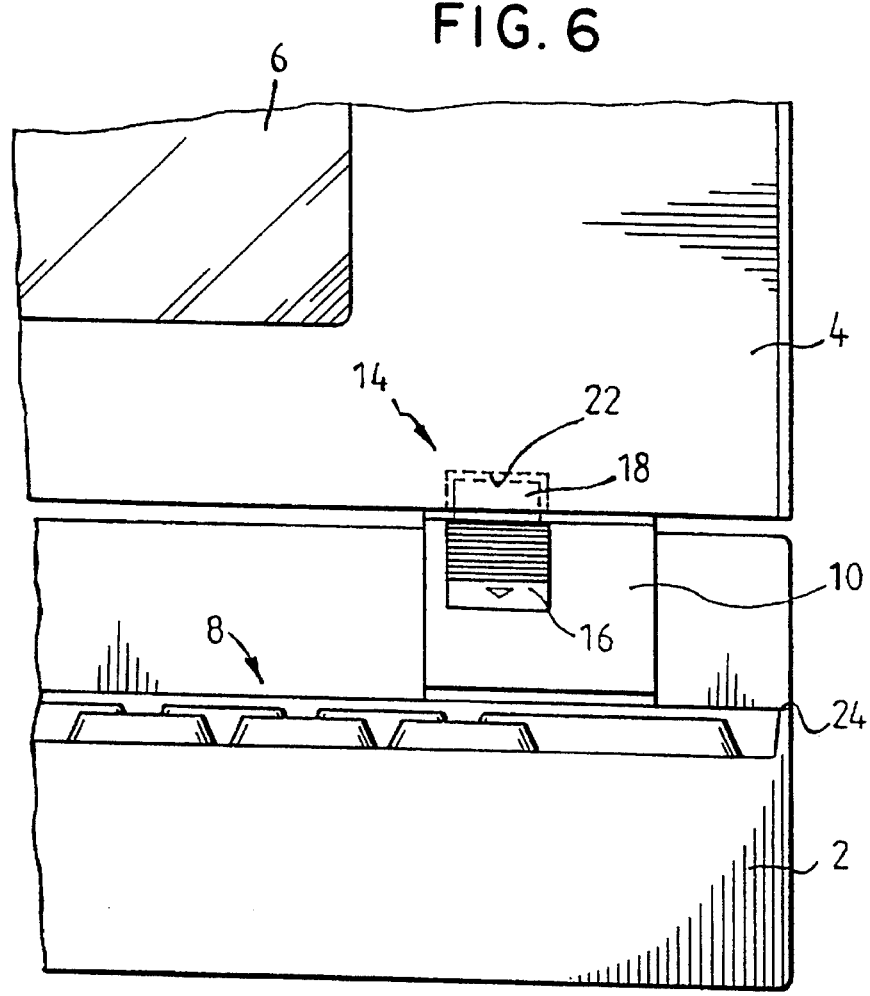
FIG. 6 is an enlarged front view showing a rotation regulating or latch means used in the computer of FIG. 1.

As shown in FIG. 6, in which the connection means 10, and other components are enlarged, the connection means 10 is provided with a rotation regulating means or latch means 14 for stopping or releasing the rotation of the cover unit 4 around the connection means 10. The latch means 14 includes a latch member 16. The latch member 16 is attached at a predetermined position of the lower edge of the connection means 10 so as to be able to move up and down and is urged in the upward direction by a biasing means (not shown) such as a spring, as is well known in the art. An engagement convexity 18 at the top end of the latch member 16 engages with an engagement concavity 22 formed in the cover unit 4. When the latch member 16 is urged upward by the biasing means and the engagement convexity 18 engages with the engagement concavity 22, the cover unit 4 is latched to the connection means 10 and thereby the rotation of the cover unit 10 around the connection means 10 is prevented. When the latch member 16 is pushed down against the biasing means to withdraw the engagement convexity 18 from the engagement concavity 22, the cover unit 4 is released from the connection means 10 and rotation of the cover unit 4 around the connection means 10 becomes possible.

Figure 5:
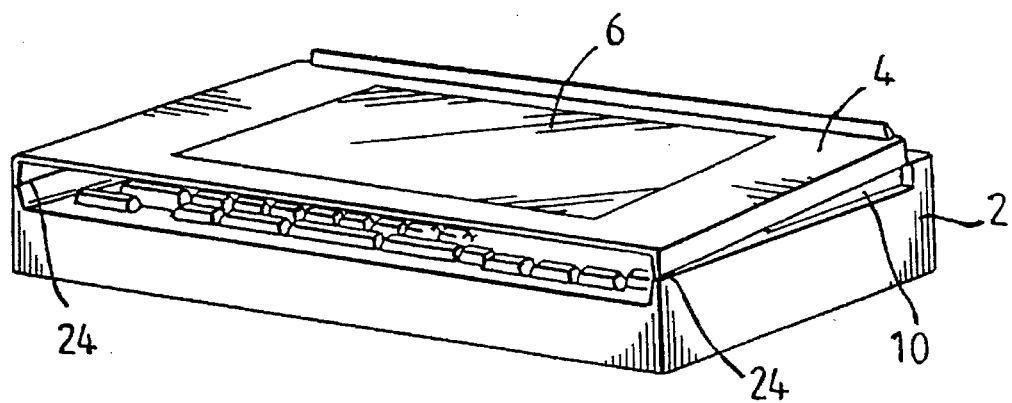
FIG. 5 is a perspective view of the computer of FIG. 1 showing the cover unit fully rotated backward around the connection means and the cover unit placed on tile system body with the display panel face up.
Figure 4:
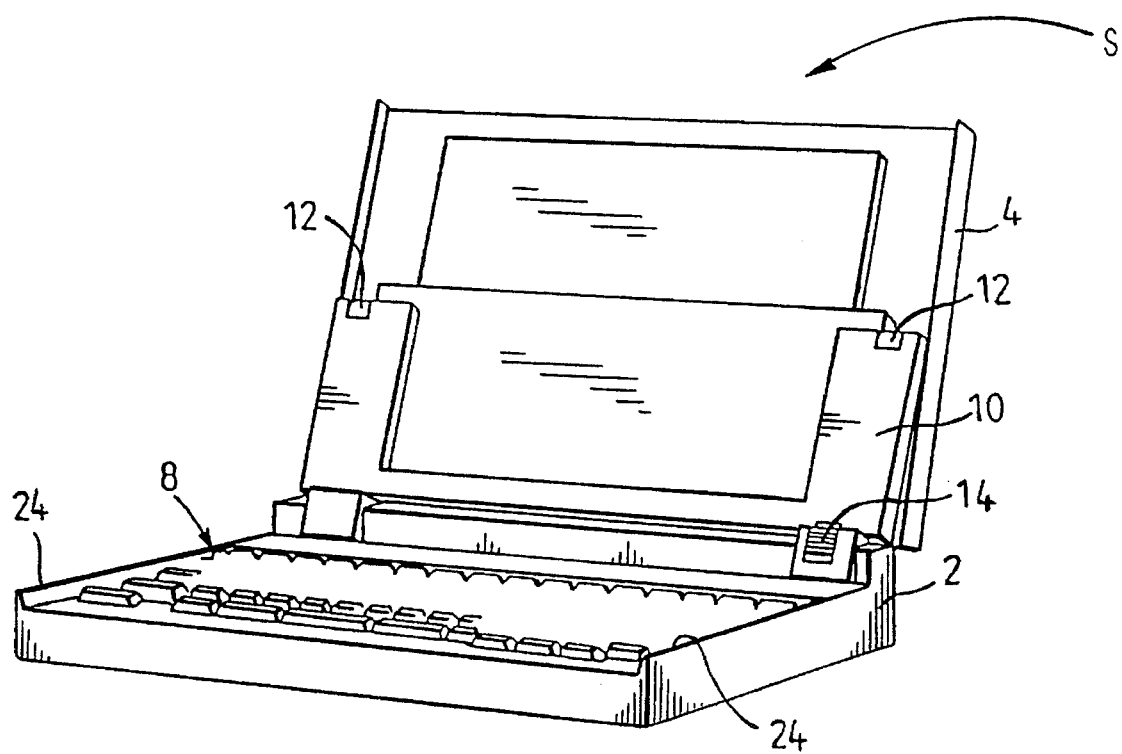
FIG. 4 is a perspective view of the computer of FIG. 1 showing the cover unit fully rotated backward around a connection means.

As shown in FIG. 3, when latch means 14 is disengaged, the cover unit 4 may be rotated around the connection unit 10 in the direction represented by arrow R, to assume the configuration illustrated in FIG. 4 in which tile cover unit 4 is fully rotated backward around the connection means 10. The cover unit 4 and the connection means 10 may then be rotated forward together in the direction represented by arrow S to a position in which the cover unit 4 is placed inside out, as shown in FIG. 5, on the system body 2 with the display panel 6 placed face up. Convexities 24 are formed at both side edges of the front end of the system body 2. The height of convexities 24 is larger than that of the top end of the keyboard 8 so that the cover unit 4 does not contact the keys of keyboard 8 when in the configuration shown in FIG. 5.

Figure 7:
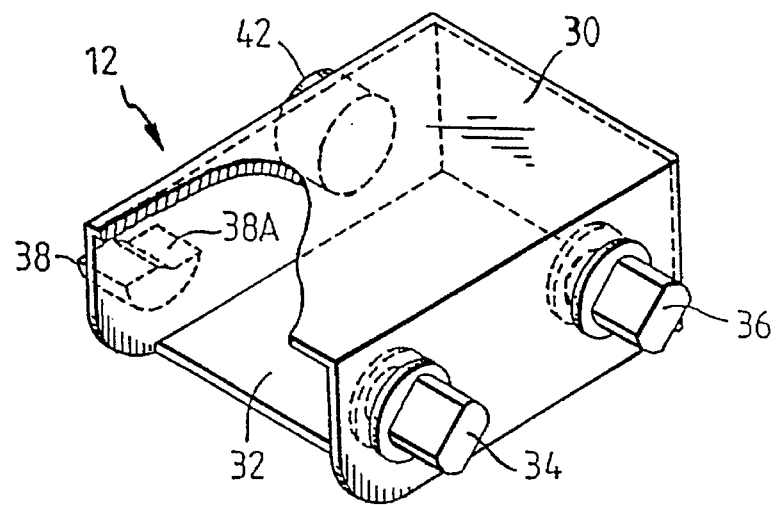
FIG. 7 is an enlarged perspective view of a hinge means used in tile computer of FIG. 1.

FIG. 7 illustrates, in an enlarged scale, hinge means 12 for rotatably connecting the cover unit 4 and the connection means 10. The purpose of connecting the cover unit 4 and the connection means 10 through the hinge means 12 is to prevent the cover unit 4, and therefore the display panel 6, from excessively tilting in tile configuration that exists when the cover unit 4 is placed inside out (as shown in FIG. 5), on the system body 2, for the purpose of using the input function of the display panel 6. If tile cover unit 4 and tile connection means 10 were directly connected to each other without using the hinge means 12, then it would be difficult to rotate the cover unit ninety degrees or more around the connection means 10, and therefore, tile display panel 6 would tilt excessively with respect to the system body 2 when tile cover unit 4 is placed inside out, on the system body 2, thus making input operations difficult.

Figure 12:
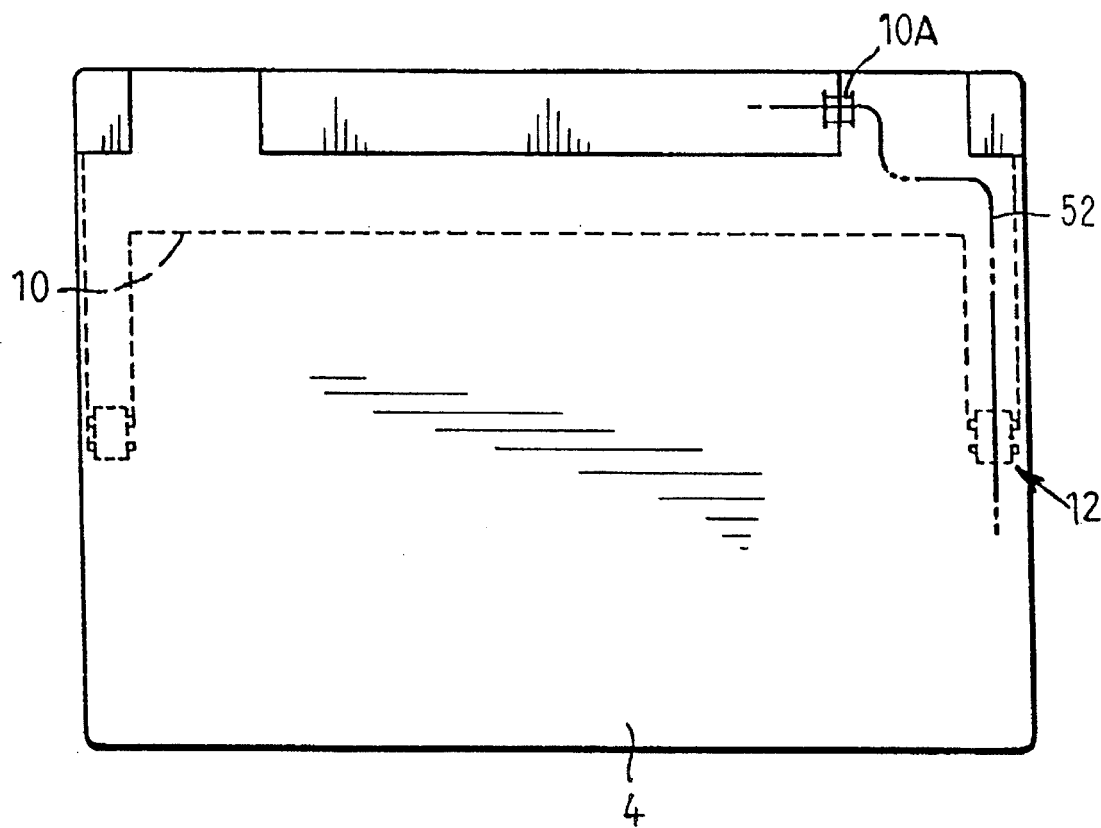
FIG. 12 is a plan view showing the wiring path of a cable in the closed position of the cover unit of the computer of FIG. 1.
Figure 13:
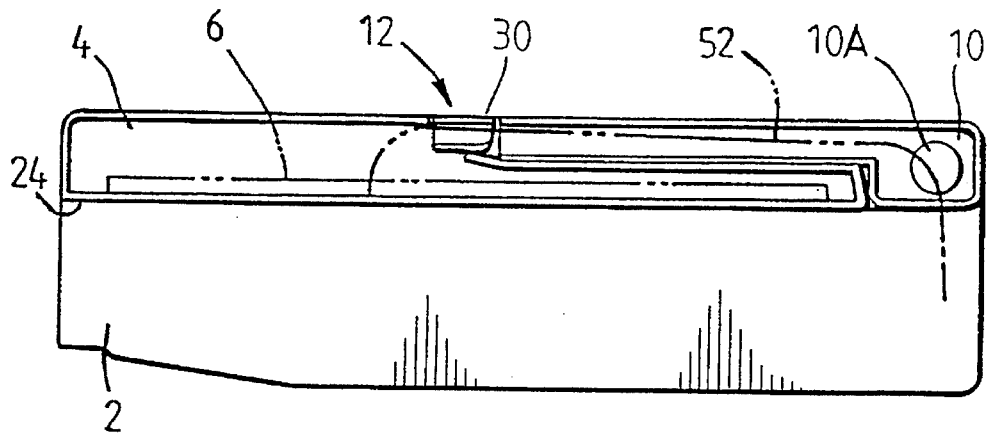
FIG. 13 is a further cross sectional view showing the wiring path of the cable in the closed position of the cover unit of the computer of FIG. 1.
Figure 14:
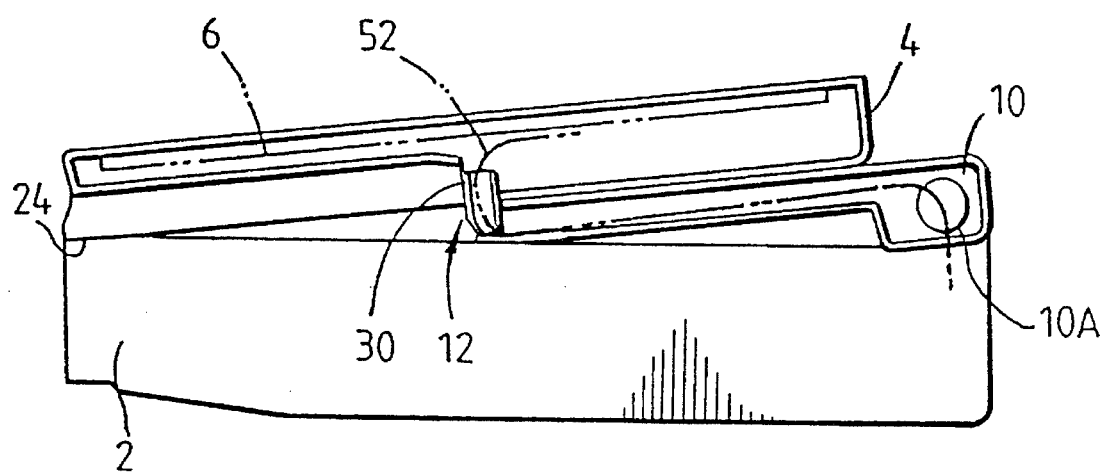
FIG. 14 is a cross sectional view showing the wiring path of the cable in tile configuration of the computer of FIG. 1 in which the cover unit is placed upside down.

In FIG. 7, the hinge means 12 includes a hollow parallelepiped 30, having a hollow 32 through which a cable 52 passes (FIG. 12 to FIG. 14). A first rotatable shaft 34 and a second rotatable shaft 36 protrude from one side wall of parallelepiped 30. The first rotatable shaft 34 is connected to the connection means 10. The second rotatable shaft 36 is connected to the cover unit 4. The base edges of the first and the second rotatable shafts 34 and 36 are mounted to parallelepiped 30 in a manner which makes them resistant to rotation, to a certain degree. The resistance to rotation of the first rotatable shaft 34 is set so that it is smaller than the resistance to rotation of the second rotatable shaft 36. The tips of the first rotatable shaft 34 and the second rotatable shaft 36 are shaped into partially flat form by beveling along the axes of rotation. The portions of the connection means 10 and the cover unit 4 to which the tips of the first rotatable shaft 34 and the second rotatable shaft 36 are mounted, respectively, are bearing sections (not shown) shaped into fiat form corresponding to the shape of the tips, and the tips of the first rotatable shaft 34 and the second rotatable shaft 36 are mounted to the connection means 10 and the cover unit 4, respectively, so as not to be able to rotate with respect thereto. However, the base edges of the first rotatable shaft 34 and the second rotatable shaft 36 are attached, as described above, to parallelepiped 30 so as to be able to rotate, and therefore the connection means 10 and the cover unit 4 can rotate with respect to one another around the hollow parallelepiped 30.

A first fixed shaft 38 and a second fixed shaft 42 protrude from the opposite side wall of the hollow parallelepiped 30. The first fixed shaft 38 is rotatably connected to the connection means 10. The second fixed shaft 42 is rotatably connected to the cover unit 4. A notch portion 38A is formed in the first fixed shaft 38. The cross section of the first fixed shaft 38 is a circle except For the notch portion 38A. The cross section of the second fixed shaft 42 is a circle. As shown in FIG. 8 to FIG. 11, the first fixed shaft 38 is attached to a first bearing section 44 of the connection means 10. A stop 46 is formed in the first bearing section 44. The first fixed shaft 38 can rotate within a predetermined range in the first bearing section 44, but cannot rotate further when the notch portion 38A contacts the stop 46.

The operations of the hinge means 12 are described by reference to FIG. 8 to FIG. 11. FIG. 8 shows the hinge means 12 when the cover unit 4 is closed (FIG. 1). In this configuration, each top surface of the connection means 10, the cover unit 4, and the hollow parallelepiped 30 is in the same plane. To use mainly the display function of the display panel, the connection means 10, the cover unit 4, and the parallelepiped 30 are positioned with respect to one another as shown in FIG. 8, even if the connection means 10 and the cover unit 4 are integrally rotated away from the system body 2 (FIG. 2). By pushing down the latch member 16 of the rotation regulating or latch means 14, the cover unit 4 can be rotated around the connection means 10. When the cover unit 4 is rotated backward around the connection means 10, the cover unit 4 and the parallelepiped 30 can rotate integrally around the connection means 10 (FIG. 9). Such a motion results because the resistance to rotation of the parallelepiped 30 with respect to the connection means 10 is smaller than the resistance to rotation of the parallelepiped 30 with respect to the cover unit 4.

Figure 10:
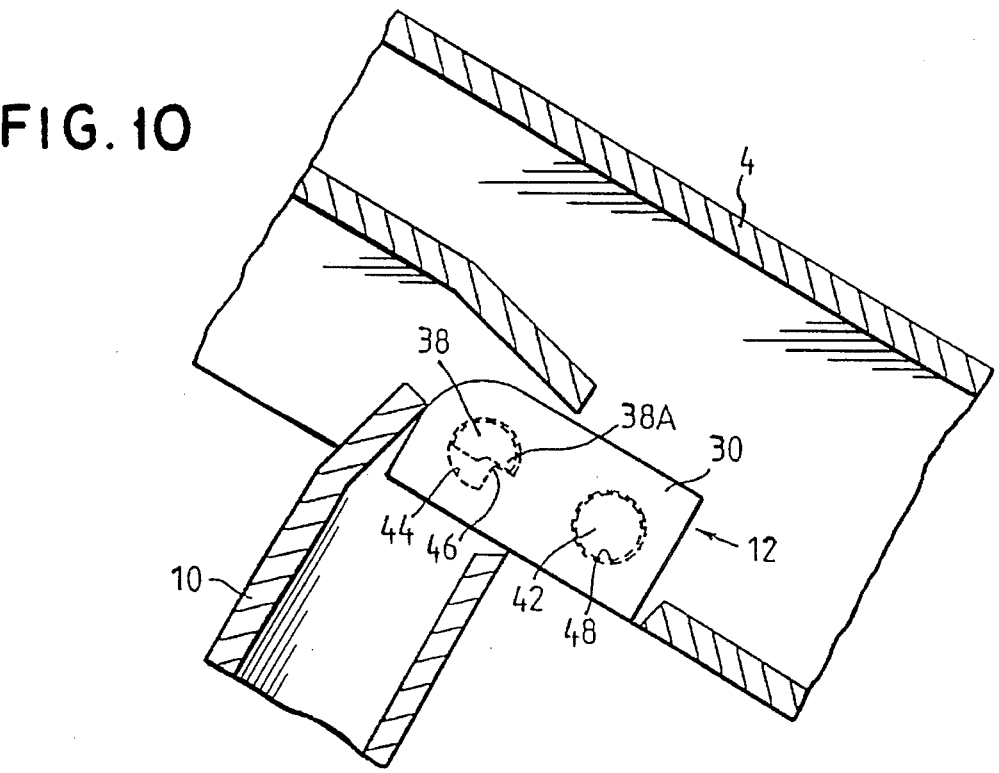
FIG. 10 is a fragmentary sectional view showing the hinge means of FIG. 7 in a position in which the rotation of the parallelepiped of the hinge means stops due to contact with the connection means.
Figure 11:
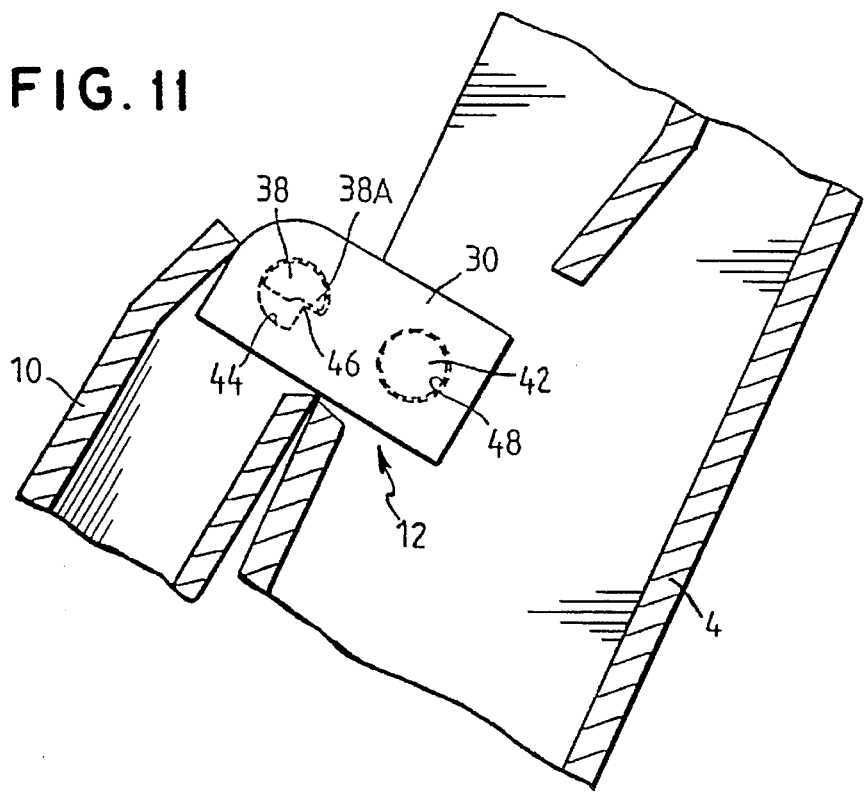
FIG. 11 is a fragmentary sectional view showing tile hinge means of FIG. 7 in a position in which the rotation of the parallelepiped of the hinge means stops due to contact with the connection means, after further rotation of the cover unit has occurred.

If the cover unit 4 is rotated backward further, tile notch portion 38A of the first fixed shaft 38 contacts the stop 46, as shown in FIG. 10, and parallelepiped 30 cannot rotate further with respect to connection means 10. In this configuration, if the cover unit 4 is rotated backward further, then the cover unit 4 starts to rotate with respect to parallelepiped 30, as shown in FIG. 11. Thus, the cover unit 4 can be placed in the configuration shown in FIG. 4. In this configuration, the connection means 10 can be rotated over the front end of system body 2 to place the cover unit 4 on the system body 2 with the display panel 6 placed face up. The display panel 6 is not placed horizontally on the system body 2, that is, it is tilted so that its front end is slightly lower than the rear end (that is, towards the user). Therefore, the convenience of operation of pen input or touch input is significantly improved in comparison with the case where the display panel 6 is placed horizontally on the system body 2.

FIG. 12 to FIG. 14 show the wiring paths of a cable 52. One end of the cable 52 is connected to a circuit substrate (not shown) within the system body 2. The other end passes through a hinge section 10A for connecting the connection means 10 and the system body 2. The cable reaches the connection means 10, as shown in FIG. 12, and passes through the hollow 32 in parallelepiped 30 of the hinge means 12. The cable extends to the display panel 6 within the cover unit 4 as shown in FIG. 13 and FIG. 14. FIG. 13 shows the wiring path of the cable 52 in the configuration in which the cover unit 4 is placed on the system body 2 with the display panel 6 placed face down (FIG. 1). FIG. 14 shows the wiring path of the cable 52 in the configuration in which the cover unit 4 is placed on the system body 2 with the display panel 6 placed face up (FIG. 5).

As described above, according to the invention, the cover unit 4 can be placed upside down on the system body 2 without the need for sliding the cover unit to the front or the rear end of the system body 2, and therefore, the mechanical construction is simple in comparison with the case where the cover unit 4 must slide. Further, if the cover unit 4 must slide, there is slack in the cable 52 at some slide position and enough space for the slack cable is needed. However, the present invention, as illustrated in FIG. 13 and FIG. 14 is free of such a problem due to the configuration of the cover unit 4 and the connection means 10. The invention therefore, has an advantage of simplicity in the wiring of the cable 52 for electrical connection between the system body 2 and the cover unit 4, and as a result has high reliability.

Further, when the display panel 6 is placed face up on the system body 2, the display panel 6 tilts downward slightly toward the front end of the system body 2, and therefore the invention has the advantage of ease of operation when used in a touch input or a pen input mode. Still further, when the cover unit 4 is placed on the system body 2 with the display panel 6 placed face up, the footprint (shape made by projection on a plane) of the cover unit 4 is within the footprint of the system body 2. Thus, the invention is excellent not only in terms of operability in a touch input or pen input mode, but also in transportability or portability.

The preferred embodiment is an example of the application of the present invention to a computer. However, the present invention also may be applied to a display apparatus provided with a base instead of the system body 2. In such embodiment, the cover unit 4 is connected, through the hinge means 12, to the connection means 10. It will be appreciated that the cover unit 4 also may be directly connected to the connection means 10. However, if the hinge means 12 is provided, tile display panel 6 can be easily kept in a position close to horizontal when the cover unit 4 is placed upside down. It also will be appreciated that the connection means may be, for example, a rotatable arm provided on both sides of the cover unit. Further, a keyboard 8 capable of being removed from the system body 2 may be used. If the cover unit 4 is placed upside down, the removable keyboard 8 is removed from the system body 2 and may be placed outside of the front end of tile system body 2 so that tile input function of the display panel 6 and the keyboard 8 can both be used.

It will also be appreciated that the construction of tile rotation regulating or latch means is not limited to that in the preferred embodiment. For example, a magnet may be used or the rotation regulating means may be excluded.

As described above, according to the present invention, a computer or a display apparatus with an input function which is simple in construction and has excellent operability of touch input or pen input can be provided.

While the invention has been described in connection with specific embodiments, it will be understood that those with skill in the art may be able to develop variations of the disclosed embodiments without departing from the spirit of the invention or the scope of the following claims:

What is claimed is:

1. A computer comprising:

a system body;

a cover unit for multi-position operation with said system body without requiring movement of said system body;

a display panel in said cover unit, said display panel being for viewing from a first side of said cover unit, said display panel having an input function sensitive to touch;

connection means for connecting said cover unit to said system body, said connection means having a first end and a second end, said first end being rotatably connected to said system body and said second end being rotatably connected to said cover unit approximately midway along said cover unit so that said cover unit can be placed over said system body with said cover unit in one of a first position wherein said display panel faces said system body and said connection means overlies and covers approximately half of said cover unit, and a second position wherein said display panel faces away from said system body;

said connection means and said cover unit being sized, shaped and connected to said system body so that when said cover unit is in said second position, said cover unit overlies and rests upon said connection means at one end of said cover unit thereby to tilt said cover unit with respect to said system body.

2. The computer of claim 1 further comprising electrical coupling means for electrically coupling said display panel to said system unit.

3. The computer of claim 2 further comprising hollow hinge means for rotatably connecting said cover unit to said connection means.

4. The computer of claim 3 wherein said electrical coupling means is an electrical cable extending through said hollow hinge means.

5. The computer of claim 1 wherein said connection means comprises an arm connected proximate an upper rear edge of said system body at said first end, and connected to a second side of said cover unit at said second end, said second side being a side from which said display panel is not viewed.

6. The computer of claim 5 further comprising hinge means for connecting said connection means to said cover unit.

7. The computer of claim 6 wherein said hinge means comprise two hinges, a first of said hinges connecting said connection means to said cover unit proximate a first end of said cover unit and a second of said hinges connecting said connection means proximate a second end of said cover unit, said first end of said cover unit being opposite said second end of said cover unit.

8. The computer of claim 7 wherein said first hinge and said second hinge define between them a longitudinal direction and said cover unit extends from said connection means in a transverse direction perpendicular to said longitudinal direction.

9. The computer of claim 8 wherein said cover unit has a height in said transverse direction, and said hinges are attached to said cover unit approximately half way along said height.

10. The computer of claim 1 further comprising latch means for releasably connecting said cover unit to said connection means so that said cover unit cannot be rotated with respect to said connection means but can still be rotated with respect to said system body.

11. The computer of claim 10 wherein said latch means comprises a portion of said cover unit having a concavity, and a latch member having a convexity, said latch member being movable between a first position where said convexity extends into said concavity and a second position where said convexity does not extend into said concavity.

12. The computer of claim 1 wherein said system body includes a keyboard having keys, said keyboard facing said cover unit when said cover unit is placed on said system body, and said system body and said cover unit being sized, shaped and dimensioned so that said cover unit does not contact said keys.

13. The computer of claim 1 wherein said keyboard is removable from said system body for placement adjacent said system body so that when said cover unit is in said second position on said system body, both said keyboard and said input function of said display panel may be used.

14. The computer of claim 1 wherein said system body and said cover unit are sized, shaped and positioned so that a footprint of said cover unit is within a footprint of said system body when said cover unit is in either one of said first position and said second position.

15. The computer of claim 1 further comprising hinge means for coupling said connecting means to said cover unit, said hinge means comprising a hollow parallelepiped, a first shaft rotatably coupled to said parallelepiped, extending from a first wall unit of said parallelepiped, and coupled to said connecting means, and a second shaft extending from said first wall of said parallelepiped, rotatably coupled to said parallelepiped, and coupled to said cover unit.

16. The computer of claim 15 wherein said first shaft has a first rotation resistance with respect to said first wall and said second shaft has a second rotation resistance with respect to said first wall, said second rotation resistance being greater than said first rotation resistance.

17. The computer of claim 16 wherein said parallelepiped has a second wall opposite said first wall and a third shaft extending from said second wall, said third shaft having a flattened portion and said third shaft extending into a bearing member of said connection means, said bearing member having a stop, said stop being for engaging, at a predetermined angle of said parallelepiped with respect to said connecting means, said flattened portion to prevent further rotation of said parallelepiped with respect to said connecting means.

18. A display comprising:

a base body;

a cover unit for multi-position operation with said base body without requiring movement of said base body;

a display panel in said cover unit, said display panel being for viewing from a first side of said cover unit, said display panel having an input function sensitive to touch;

connection means for connecting said cover unit to said base body, said connection means having a first end and a second end, said first end being rotatably connected to said system body and said second end being rotatably connected to said cover unit so that said cover unit can be placed over said base body with said cover unit in one of a first position wherein said display panel faces said base body and said connection means overlies and covers a portion of said cover unit, and a second position wherein said display panel faces away from said base body;

said connection means and said cover unit being sized, shaped and connected to said base body so that when said cover unit is in said second position, said cover unit overlies and rests upon said connection means at one end of said cover unit thereby to tilt said cover unit with respect to said base body.

19. The display of claim 18 further comprising electrical coupling means for electrically coupling said display panel to said base body.

20. The display of claim 19 further comprising hollow hinge means for rotatably connecting said cover unit to said connection mean.

21. The display of claim 20 wherein said electrical coupling means is an electrical cable extending through said hollow hinge means.

22. The display of claim 18 wherein said connection means comprises an arm connected proximate an upper rear edge of said base body at said first end, and connected to a second side of said cover unit at said second end, said second side being a side from which said display panel is not viewed.

23. The display of claim 22 further comprising hinge means for connecting said connection means to said cover unit.

24. The display of claim 23 wherein said hinge means comprise two hinges, a first of said hinges connecting said connection means to said cover unit proximate a first end of said cover unit and a second of said hinges connecting said connection means proximate a second end of said cover unit, said first end of said cover unit being opposite said second end of said cover unit.

25. The display of claim 23 wherein said first hinge and said second hinge define between them a longitudinal direction and said cover unit extends from said connection means in a transverse direction perpendicular to said longitudinal direction.

26. The display of claim 25 wherein said cover unit has a height in said transverse direction, and said hinges are attached to said cover unit approximately half way along said height.

27. The display of claim 18 further comprising latch means for releasably connecting said cover unit to said connection means so that said cover unit cannot be rotated with respect to said connection means but can still be rotated with respect to said base body.

28. The display of claim 27 wherein said latch means comprises a portion of said cover unit having a concavity, and a latch member having a convexity, said latch member being movable between a first position where said convexity extends into said concavity and a second position where said convexity does not extend into said concavity.

29. The display of claim 19 wherein said base body and said cover unit are sized, shaped and positioned so that a footprint of said cover unit is within a footprint of said base body when said cover unit is in either one of said first position and said second position.

30. The display of claim 19 further comprising hinge means for coupling said connecting means to said cover unit, said hinge means comprising a hollow parallelepiped, a first shaft rotatably coupled to said parallelepiped, extending from a wall unit of said parallelepiped, and coupled to said connecting means, and a second shaft extending from said first wall of said parallelepiped, rotatably coupled to said parallelepiped, and coupled to said cover unit.

31. The display of claim 30 wherein said first shaft has a first rotation resistance with respect to said first wall and said second shaft has a second rotation resistance with respect to said first wall, said second rotation resistance being greater than said first rotation resistance.

32. The display of claim 31 wherein said parallelepiped has a second wall opposite said first wall and a third shaft extending from said second wall, said third shaft having a flattened portion and said third shaft extending into a bearing member of said connection means, said bearing member having a stop, said stop being for engaging, at a predetermined angle of said parallelepiped with respect to said connecting means, said flattened portion to prevent further rotation of said parallelepiped with respect to said connecting means.

* * * * *